(No Model.)
J. H. RICHFORD.
DRAFT EQUALIZER.
No. 510,710.   Patented Dec. 12, 1893.
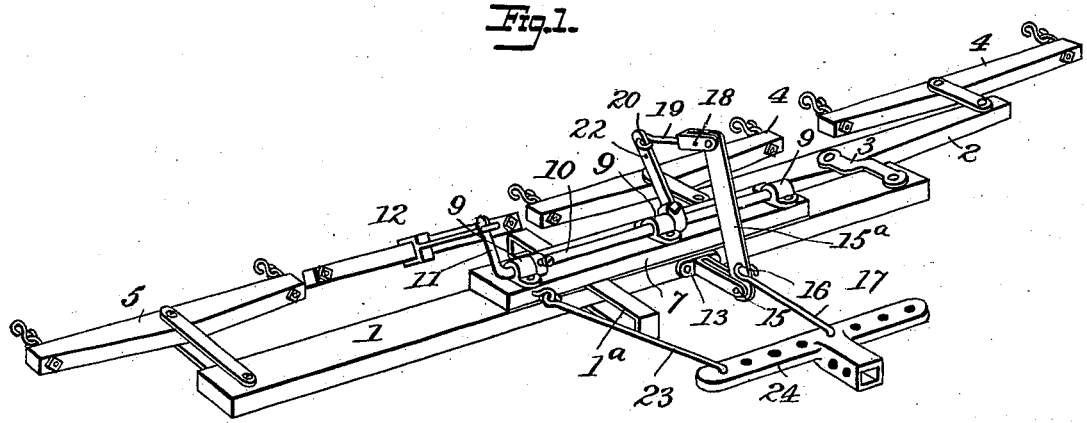
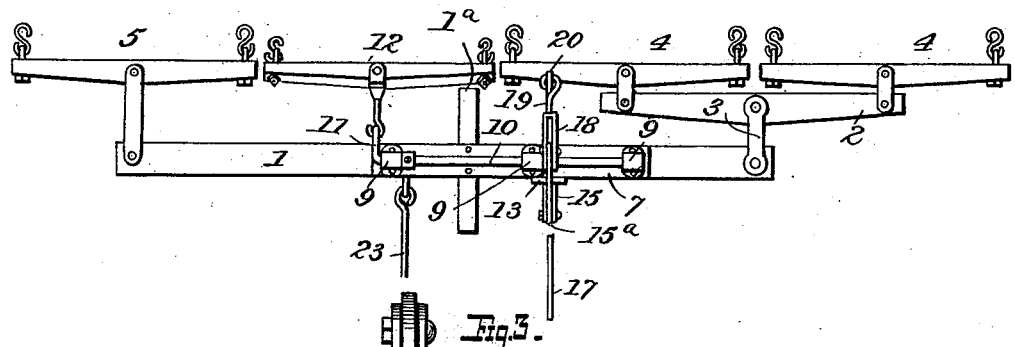
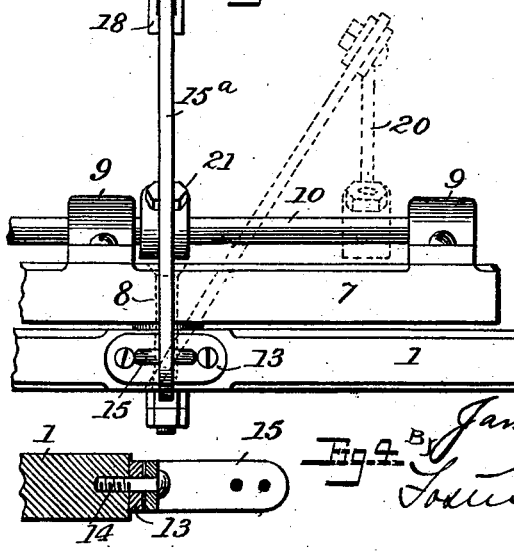
Witnesses
A. N. Dobson
G. P. Kramer
Inventor
James H. Richford
By
John Freeman
Attorneys

UNITED STATES PATENT OFFICE.

JAMES H. RICHFORD, OF PEORIA, ILLINOIS.

DRAFT-EQUALIZER.

SPECIFICATION forming part of Letters Patent No. 510,710, dated December 12, 1893.

Application filed June 9, 1893. Serial No. 477,095. (No model.)

*To all whom it may concern:*

Be it known that I, JAMES H. RICHFORD, a citizen of the United States, residing at Peoria, in the county of Peoria and State of Illinois, have invented certain new and useful Improvements in Draft Eveners or Equalizers, of which the following is a specification.

This invention relates to certain new and useful improvements in horse-power drafteveners or equalizers; and it consists substantially in such features of arrangement, construction, and combinations of parts as will hereinafter be more particularly described.

Certain disadvantages have attended the use of draft-eveners or equalizers as constructed and arranged heretofore, owing to the fact that in most instances the point of attachment of the object to be drawn has always been at the center of the evener-bar, the tendency of which is to produce a lateral or side-draft which is impossible to overcome except by the use of cumbersome and complicated devices. Furthermore, in the case of plowing, where the resistance offered by the plow is to one side of or at an angle to the line of draft, it is extremely difficult to maintain the plow in the direction it is intended the same shall follow, owing to the inequality of draft produced by the horse or team of horses at each end of the evener-bar. As the horses at each end of the evener-bar are hitched at equal distances from the point of attachment of the object drawn, it is evident that a thorough equalization of the draft or pulling force is amost impossible. In instances of plowing, say with four horses, to do the work properly, and with the least strain upon the horses, one horse should walk in the furrow and the other three on the unbroken ground to the side thereof. With the old construction and arrangement, however, the horses at each end of the evener-bar being at equal distances from the center of such bar, renders it practically impossible to keep the horses in the positions or directions they should follow, and it will be found that the fourth horse will usually be crowded out of the furrow over onto where the previous furrow was turned. In this way, the plowing is made very unsteady, which subjects the animals to great strain, besides exerting considerable wear and tear on the operative devices.

The object of the present invention is to overcome the objections mentioned and to provide a draft-evener or equalizer embodying all the prerequisites to a perfectly operating device, and one also in which the several parts shall always be effective and reliable.

It is the purpose of my invention to provide a draft-evener or equalizer in which four horses are preferably employed, although as will more fully hereinafter appear, five horses could be employed equally as well, and then again, if found desirable, three horses only need be employed. The parts of my device or equalizer are so constructed and arranged as to be readily adjusted to the weight to be drawn, and also to maintain the line of draft coincident with or parallel to the line of traction of the object drawn.

In carrying my invention into effect, I provide the usual evener-bar to one end of which a team of horses is hitched by means of the ordinary double and singletrees; while to the opposite end thereof, a single horse is hitched also by means of a single tree. Instead of attaching the plow or other object to be drawn, to the center of the evener-bar, I make the point of attachment thereof to one side of the center of such bar, and employ a connecting medium that is movable or adjustable both forwardly and backwardly of the evener-bar, as well as longitudinally of the same within certain limits. I employ an auxiliary evener-bar pivoted to the main bar at a point to one side of the center of said bar, say for instance, at about one-third the length of such bar. The said main and auxiliary evenerbars are so arranged relatively as that their movement with respect to each other is properly guided; and their individual functions will be hereinafter more fully explained. I also employ a shaft to one end of which the inner or fourth horse is hitched; and arranged upon this shaft is the principal portion of the devices for effecting the adjustment of the line of draft both in advance of and to the rear of the shaft, as well as lengthwise of the same.

In the accompanying drawings Figure 1, is a view in perspective, of a horse power draftevener or equalizing device, embodying my improvements; and Fig. 2, is a top or plan view thereof. Fig. 3, is a longitudinal side elevation of the same looking from the rear; and Fig. 4, is a view in detail representing more clearly the construction and working of certain parts.

In the drawings, 1 indicates the usual evener-bar frequently employed in this class of devices; and 2 represents an ordinary doubletree attached to the same at one end by means of the well-known form of clip 3. Pivotally attached to the said doubletree at or near each end is a singletree 4; while attached in like manner to the opposite end of the evener-bar 1, is an additional singletree 5. From this, it will appear that at one end of the evener-bar a team of horses is to be hitched or employed, while at the opposite end of said bar a single horse only is to be hitched.

Pivoted to the top or on the upper side of the evener-bar 1, is an auxiliary bar 7, which, as shown, is considerably shorter than the main bar; and it will be observed that the pivot 8, on which said auxiliary bar turns is at a point to one side of the middle or center of length of both of said bars 1 and 7. In other words, the pivotal point is located a distance from one end of the main bar about equal to one-third the whole length of said bar; the purpose of which will appear more fully hereinafter.

Attached to the under side of the auxiliary bar at near one end (the inner end) and embracing the sides of the main bar 1, is a loop or guide 1ª, for maintaining the relative positions of the two bars, as well as limiting the lateral play or movement thereof. The said auxiliary bar 7, is provided on its upper side with suitable bearings or boxes 9, 9, 9, in which is supported a suitable shaft 10, the inner end of which shaft is bent or turned approximately perpendicularly to constitute a crank or arm 11, to the end of which is pivotally suspended a singletree 12, to which the inner or fourth horse is to be hitched or attached.

13 represents a plate secured to the rear edge of the main evener-bar 1, to which plate is secured by means of a screw or bolt 14, a movable or swivel-bracket 15, which is adapted to be turned on the screw to one side or the other (see dotted lines, Fig. 4) and thereby conform to any adjustment of the crank or arm on the shaft 10, hereinafter referred to. Between the two sides of the said swivel-bracket is pivotally supported in an upright manner, an arm 15ª, which is provided with an eye 16, for the attachment or connection of the hooked end of the draft-bar 17; the said arm 15ª being adapted to swing back and forth on its pivot, and having loosely attached or suspended to its upper end a link 18, which is formed or provided with a hook 19, as shown.

Movably supported on the shaft 10, so as to be adjustable lengthwise of said shaft, is an arm 20, which ordinarily occupies an upright position, that is to say, the parts all being balanced and the conditions equal. It will be observed that a set-screw 21, is employed to secure this arm to any part of the shaft to which the same may be moved; and it will also be observed that by turning said bar either forwardly or backwardly of the evener-bar 1, the arm 15ª will be correspondingly altered in position by reason of the connection of the hook 19, with said arm 20, as shown. The arm 20 is provided with a hole 22, or may be provided with a series of such holes, so as to alter the point of connection between the two arms. It will be still further observed that by virtue of the central arrangement of one of the bearings 9, on the auxiliary evener-bar, the movement of the arm 20, is limited so as not to be carried past the pivotal point of such auxiliary bar. Whenever the arm 20 is moved lengthwise of the shaft, the arm 15ª will be correspondingly turned in the manner indicated in dotted lines, and thus will it be seen that the draft may be readily adjusted to suit the requirements of use which can readily be determined after operating in the field for a short while. To that end of the auxiliary evener-bar farthest from the pivotal point thereof is attached or fastened a brace-rod 23, which may be attached at its free end to the plow-clevis or other object being drawn, so as to hold the said auxiliary evener in proper relative working position. As indicated in the drawings, the end of said brace-rod is fastened in an eye 24, formed in the plow-clevis.

I have shown and described a certain construction and arrangement of the auxiliary evener-bar relative to the main bar 1, as well as a construction and arrangement of the shaft that is supported by the bar first named; but it is evident that immaterial changes therein could be resorted to and still come within the scope of my invention. Again, I have set forth and illustrated a certain construction and arrangement of devices which are adjustable both longitudinally and transversely of said shaft, so as to alter the line of draft to the weight or object to be drawn, but it will be understood that my invention is intended to include any device for effecting such adjustments irrespective of the devices shown, which, however, it may be said have been found to be practical and effective in use.

From the description and illustrations furnished, it will appear that by slipping the arm 20 outwardly on the shaft 10 or toward the end of the evener-bar, to which the team of horses is supposed to be fastened or hitched, it will of course carry the arm 15ª over in the direction of the two horses also; thus a very simple means is supplied for adjusting the draft to the traction of the weight to be pulled. Again, by means of the arm 20, being adjustable forwardly and backwardly of the shaft, the relative positions of the parts can be so changed and fixed as to regulate the position of the draft to suit either single horse, as well as the pair of horses. It will further appear that the main and auxiliary evener-bars have an independent play or movement to each other; and by which means the jerky motion of the team of horses and the inner horse will not affect the outer horse, and vice versa.

By simply lengthening the main evener-bar, it will be apparent that I could use five horses as well as four, but for general use, four horses are all that I propose to employ.

On reference to the detail view, Fig. 3, it will be seen that instead of employing the swivel-bracket hereinbefore referred to, a simple eye-bolt and link connection is shown between the evener 1 and the arm 15ª.

The adjusting devices can be set to the desired positions as is apparent; and by virtue of the described connection of the draft bar to the arm 15, it will be seen that such draft bar is of course, made adjustable both laterally as well as transversely of the evener-bars.

The several parts can be readily made and put together, and whenever a part becomes broken, it can easily be replaced by another.

Without limiting myself to the construction and arrangement of parts shown, I claim—

1. A draft equalizer comprising a main bar having draft attachments, an auxiliary bar pivoted on said main bar, a shaft on said auxiliary bar, and draft adjusting devices connecting said shaft and main bar, substantially as described.

2. A draft equalizer comprising a main bar having draft attachments, an auxiliary bar pivoted on said main bar, a shaft on said auxiliary bar formed or provided on one end with an arm, and draft adjusting devices connecting said shaft and main bar, substantially as described.

3. A draft equalizer comprising a main bar having draft attachments, an auxiliary bar pivoted on said main bar, a shaft on said auxiliary bar, an adjustable device on said shaft, and connections between said device and main bar, substantially as described.

4. A draft equalizer comprising a main bar having draft attachments, an auxiliary bar pivoted on said main bar, a shaft on said auxiliary bar, an adjustable device on said shaft, and swivel connections between said device and main bar, substantially as described.

5. A draft equalizer comprising a main bar having draft attachments, an auxiliary bar pivoted on said main bar, a shaft on said auxiliary bar, and connections between said shaft and main bar which are adjustable both radially and longitudinally, substantially as described.

6. A draft equalizer comprising a main bar having draft attachments, and an auxiliary bar, the two bars pivoted together at a point to one side of their centers, a shaft on said auxiliary bar, and draft adjusting devices connecting said main bar and shaft, substantially as described.

7. A draft equalizer comprising a main bar having draft attachments, an auxiliary bar pivoted on said main bar, an arm adjustable on said shaft and provided with a set screw, an arm pivoted at its lower end to the main bar, and a movable connection uniting the upper ends of said arms, substantially as described.

8. A draft equalizer comprising a main bar having draft attachments, an auxiliary bar pivoted on said main bar, an arm adjustable on said shaft, a corresponding arm pivotally supported by the main bar, and a movable adjustable connection between said arms, substantially as described.

9. A draft equalizer comprising a main bar, auxiliary bar, a shaft on the latter bar, draft adjusting devices between the shaft and main bar, and the loop for guiding and limiting the turning of said auxiliary bar, substantially as described.

10. In a draft-evener or equalizer, a main bar provided at one end with a suitable doubletree and singletrees, and at its opposite end with a singletree, an auxiliary bar pivoted to said main bar to one side of the centers thereof, a shaft supported by said auxiliary bar, adjustable devices between said shaft and the main bar, an adjustable draft-bar secured to said devices, a brace-rod extending from the inner end of the auxiliary bar rearwardly, and a singletree attached to an arm projecting from the inner end of the shaft, substantially as described.

In testimony whereof I have signed my name to this specification in the presence of two subscribing witnesses.

JAMES H. RICHFORD.

Witnesses:
 D. W. VOORHEES, Jr.,
 FERD LUTHY.